United States Patent [19]
Levinson

[11] Patent Number: 5,045,660
[45] Date of Patent: * Sep. 3, 1991

[54] INVERTIBLE, MICROWAVE OVEN APPARATUS

[76] Inventor: Melvin L. Levinson, 8 Stratford Cir., Edison, N.J. 08820

[*] Notice: The portion of the term of this patent subsequent to Mar. 6, 2007 has been disclaimed.

[21] Appl. No.: 431,752

[22] Filed: Nov. 6, 1989

Related U.S. Application Data

[60] Continuation-in-part of Ser. No. 141,692, Jan. 7, 1988, Pat. No. 4,906,806, which is a continuation of Ser. No. 737,502, May 24, 1985, abandoned, and a continuation-in-part of Ser. No. 106,240, Oct. 7, 1987, Pat. No. 4,923,704, which is a division of Ser. No. 737,502, May 24, 1985, abandoned.

[51] Int. Cl.$^5$ ............................................. H05B 6/80
[52] U.S. Cl. ...................... 219/10.55 E; 219/10.55 F; 426/243; 99/DIG. 14
[58] Field of Search ................... 219/10.55 E, 10.55 F, 219/10.55 R; 99/DIG. 14, 451; 426/107, 241, 243, 234

[56] References Cited

U.S. PATENT DOCUMENTS

| | | | |
|---|---|---|---|
| 3,941,967 | 3/1976 | Sumi et al. | 426/243 |
| 3,985,990 | 10/1976 | Levinson | 219/10.55 E |
| 4,306,133 | 12/1981 | Levinson | 219/10.55 E |
| 4,362,917 | 12/1982 | Freedman et al. | 219/10.55 E |
| 4,478,349 | 10/1984 | Haverland, Jr. et al. | 219/10.55 E |
| 4,496,815 | 1/1985 | Jorgensen | 219/10.55 E |
| 4,496,816 | 1/1985 | McNamara | 219/10.55 E |
| 4,906,806 | 3/1990 | Levinson | 219/10.55 E |

Primary Examiner—Philip H. Leung
Attorney, Agent, or Firm—Harry B. Keck

[57] ABSTRACT

For use in a microwave oven, an invertible microwave-oven oven is provided which includes; a first heating member which has a first surface to heat a food in contact therewith; a second heating member which has a second heating surface to heat a food in contact therewith; connector means which engages with the first and second heating members and which keeps the first and second members in engagement while the apparatus is inverted; a cooking chamber defined by, at least, the first heating member and said second absorptive heating member; a microwave-absorptive substance for each of the heating surfaces, adapted to become hot when exposed to microwave energy and to heat the heating surfaces; and optionally, by auxiliary metal pan members for use within the steam-confining chamber. The connector means may include a microwave-reflective band disposed to adjust the amount of microwave energy directly entering the cooking chamber.

36 Claims, 6 Drawing Sheets

INVERTIBLE, MICROWAVE OVEN APPARATUS

CROSS REFERENCE TO RELATED APPLICATIONS

This application is a continuation-in-part of my co-pending applications:

(a) Ser. No. 141,692 filed Jan. 7, 1988, now U.S. Pat. No. 4,906,806, which was a continuation of then co-pending application Ser. No. 737,502 filed May 24, 1985, now abandoned; and (a) Ser. No. 106,240 filed Oct. 7, 1987, now U.S. Pat. No. 4,923,704 which was a division of then copending application Ser. No. 737,502 filed May 24, 1985, now abandoned.

BACKGROUND OF THE INVENTION

1. Field of the Invention

The present invention concerns an invertible, microwave cooking chamber and methods of cooking, therein. This cooking chamber, hereafter, will be called "an invertible, microwave-oven oven" for use in a microwave oven. An invertible, microwave-oven oven comprises two opposing microwave-absorptive heating members, a chamber forming member and, optionally, one or more pan members. The members may be employed in a variety of combinations. The invention further relates to methods for cooking foodstuffs, in the invertible, microwave-oven oven, e.g. baking, broiling, crusting, frying, pressure cooking, searing and toasting.

2. Description of the Prior Art Follows

U.S. Pat. Nos. 3,701,872 and 3,777,099 describe preheating a metal microwave-absorptive grill (i.e. a metal grill heated by a microwave-absorptive heating member) for use in a microwave oven. U.S. Pat. Nos. 3,731,037 and 3,881,027 describe methods and apparatus for cooking food in containers within a preheated, heat-insulated microwave oven chamber. U.S. Pat. Nos. 3,854,023 and 3,985,991 describe methods and apparatus for cooking foods in metal containers in a microwave oven. U.S. Pat. No. 4,027,132 describes cooking double crust pies in a microwave oven. U.S. Pat. No. 4,280,032 describes microwave egg cooking. U.S. Pat. No. 3,914,967 describes various microwave heating grills and microwave-reflective grill covers.

This invention concerns the apparatus and methods taught in copending applications, "Cooking Kit With Heat Generating Member for Microwave Oven and Methods for Microwave Cooking", filed Jan. 7, 1988, Ser. No. 141,692, now U.S. Pat. No. 4,906,806 and "Methods for Microwave Cooking", filed Oct. 7, 1987, Ser. No. 106,240, now U.S. Pat. No. 4,923,704. This invention adds a second microwave-absorptive heating member, different-height, engaging, stabilizer, spacer members and new cooking procedures to these applications.

MICROWAVE COOKING

Microwave cooking is conducted in microwave ovens which have appropriate, oven, boundary walls which confine microwave energy introduced into an oven chamber. In a microwave oven most foods and certain microwave absorptive materials become heated when exposed to microwave energy. Only microwave ovens supplied with infrared heating members, have heat insulating walls.

Numerous cooking utensils are available, which have been specially designed for use in microwave ovens. They are microwave steak-makers, browning dishes, egg cookers, pizza pie cookers, bacon cookers, et cetera. Each of these special purpose devices employs its own unique operating sequence to cook a particular food product.

THE PRESENT INVENTION AND THE RELATED APPLICATIONS

In the related applications, there is described a kit of members which make it possible for a microwave oven to bake, boil, broil, crust, fry, pressure cook, sear, steam and toast. These related applications describe methods for cooking foods such as eggs; meats and vegetables; frozen foods including TV dinners, souffles, pizza pies, one-crust and two-crust pies; cakes, cookies, rolls, fruit turnovers, biscuits, breads; and cooking deep fried prepared frozen foods such as fried chicken, fried shrimp and the like.

The invertible, microwave-oven oven, of the instant disclosure, improves over the apparatus and simplifies most, but, lacking a microwave-shielded collection chamber, not all, of the cooking procedures, of the related applications, by replacing the microwave-transmissive bowl, of the related applications, with a second microwave-absorptive heating member. The invertible, microwave-oven oven differs in that it employs an engaging, stabilizer, spacer member. Optionally, the spacer member may include a microwave-reflective shield to adjust the amount of microwave energy entering a baking food as bread or cake.

The kit of said related applications and the invertible, microwave-oven oven of the instant invention have overlapping and independent utility. It is expected that some may wish to increase the number of members, and so the utility, of the kit of said related applications, by adding to the present members of said kit, a second microwave-absorptive member and the various size and type engaging, spacer members of this invention. A representative way of adding the second microwave-absorptive heating member and the spacer members of this invention, to the members of said related kit, will be describe infra.

STATEMENT OF THE PRESENT INVENTION

According to the present invention, for use in a microwave oven, an invertible microwave-oven oven is provided which includes: a first microwave-absorptive heating member which has a first heating surface to heat a food in contact therewith; a second microwave-absorptive heating member which has a second heating surface to heat a food in contact therewith; microwave-absorptive substances which heat the heating surfaces when exposed to microwave energy; connector means which engages with said first and second microwave-absorptive heating members and which keeps said first and second members in engagement while the microwave-oven oven is inverted; a cooking chamber defined by, at least, said first microwave-absorptive member and said second microwave-absorptive heating member; and, optional auxiliary metal pan members for use within the said cooking chamber. The connector means may include microwave-reflective means to adjust the amount of microwave energy directly entering the cooking chamber.

DESCRIPTION OF THE DRAWINGS

The advantages and benefits resulting from the described invertible, microwave-oven oven will become apparent from the following detailed description by reference to the accompanying drawings in which.

DESCRIPTION OF THE PREFERRED EMBODIMENTS

The preferred embodiment concerns two identical heating members. The invertible, microwave-oven oven comprises a first heating member, a second heating member and an engaging, securing member. In the explanation that follows a number followed by letter "A" will refer to a part on the first microwave-absorptive heating member and a number followed by the letter "B" will refer to a part on the second microwave-absorptive heating member. When no letter follows a number, the part, common to the first microwave-absorptive heating member and to the second microwave-absorptive heating member, is referred to.

FIGS. 1-4 are different views of the two identical microwave-absorptive heating members. In a well known manner, the microwave-absorptive heating member has a high-temperature-resistant, microwave-permeable base 4 supporting the periphery of a metal grill 3, a microwave-absorptive heating element 2 is in thermal contact with a reverse side of metal grill 3. Metal grill 3 has a food contacting surface 23. Heat-insulating handles 5 and heat-insulating feet 6 are illustrated. A wall 22 extends normally to the plane of the surface 23.

Figure 1:
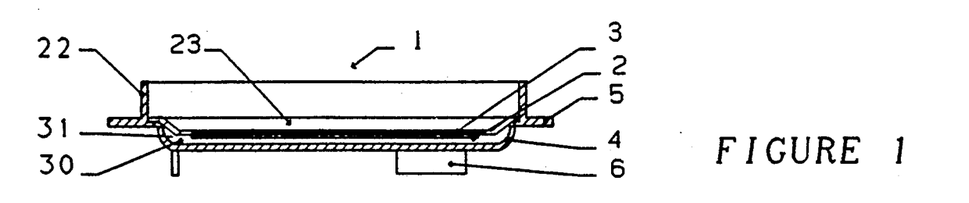
FIG. 1 illustrates a side-view, cross-section of a first or a second heating member.
Figure 2:
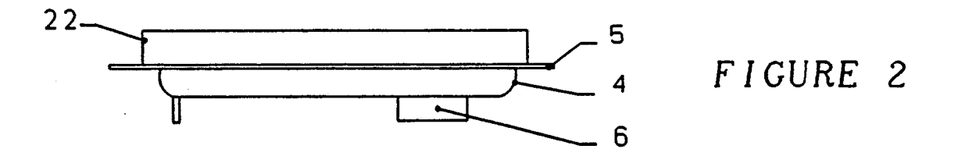
FIG. 2 illustrates a side view of a first or a second heating member.
Figure 3:
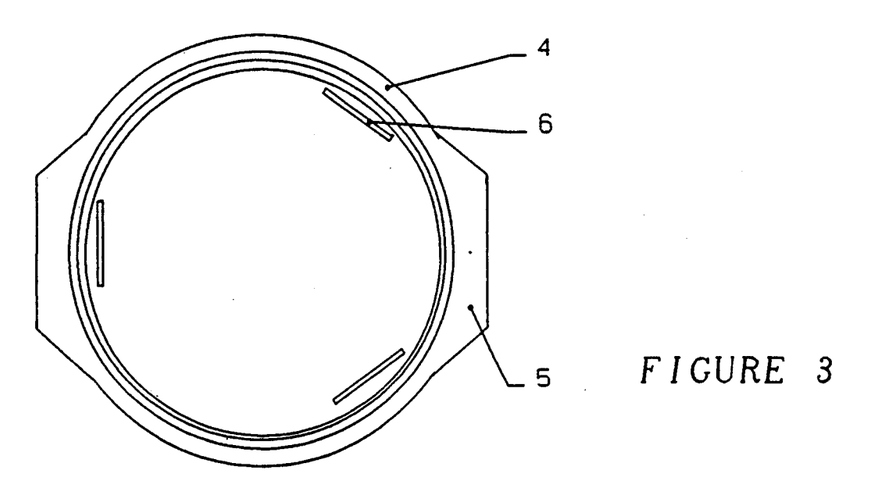
FIG. 3 illustrates a bottom view of a first or a second heating member.
Figure 4:
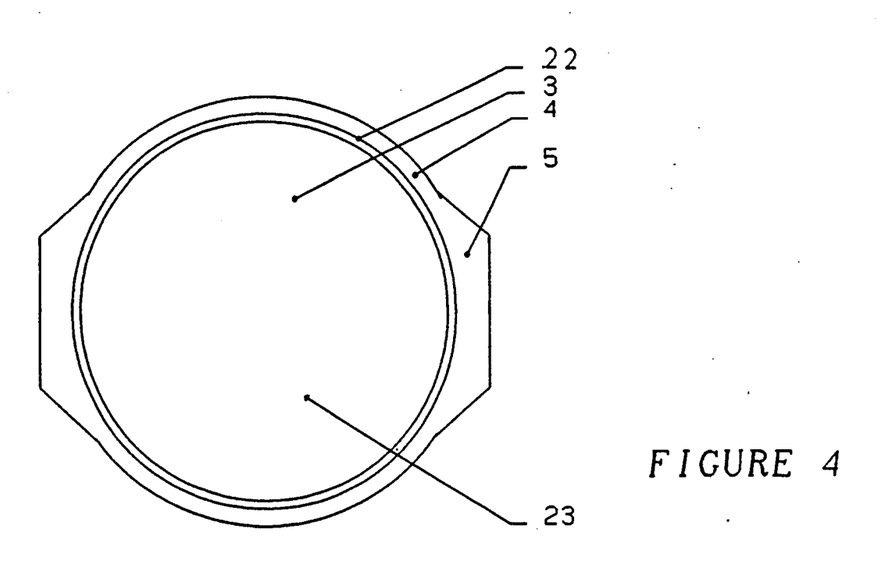
FIG. 4 illustrates a top view of a first and/or a second heating member.
Figure 5:
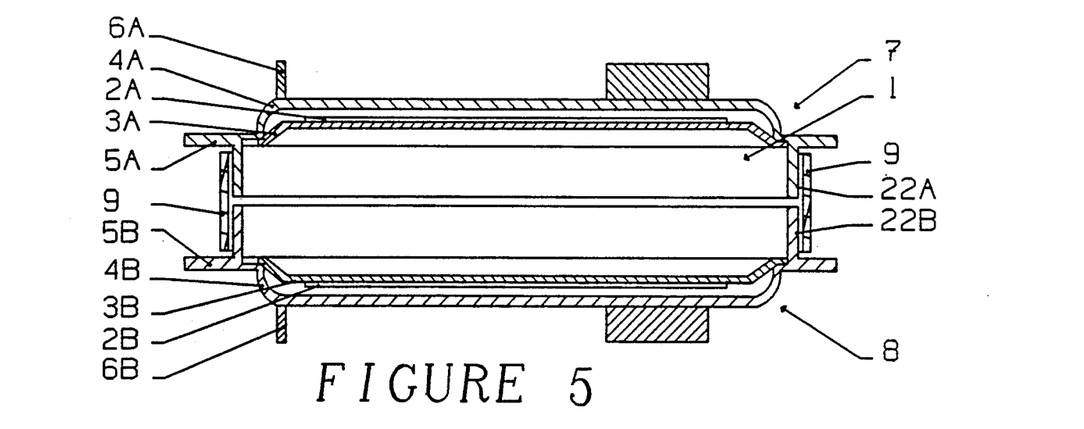
FIG. 5 illustrates a side-view cross-section of a first heating member employed as a top cover, a mating, second heating member employed as a bottom pan, and a small, engaging band enclosing a chamber formed by said first and second members.

FIG. 5 illustrates the assembled invertible, microwave-oven oven. The first microwave-absorptive heating member 7 has an engaging wall 22A and the second microwave-absorptive heating member 8 has an engaging wall 22B. The walls 22A and 22B are secured together by engaging, securing member 9. A cooking heating chamber 1 is defined by first and second microabsorptive heating members 7 and 8 and securing member 9. The heating members 7 and 8 differ from similar heating members in the market because they are fabricated with engaging members, shown as walls 22A and 22B designed to engage with an engaging, securing member. The assembly of FIG. 5 is useful in the illustrated position and in the inverted position.

Figure 6:
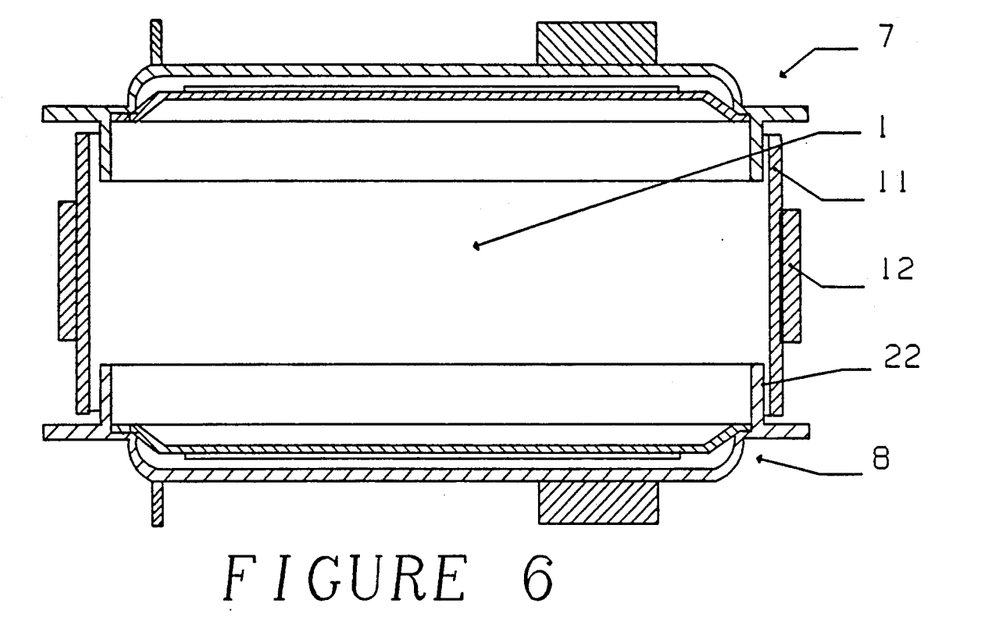
FIG. 6 illustrates a side-view cross-section of a first heating member employed as a cover and as a top heating member, a second heating member employed as a pan and as a bottom heating member, a large-size band enclosing a chamber formed by the band and by the first and second heating members.
Figure 7:
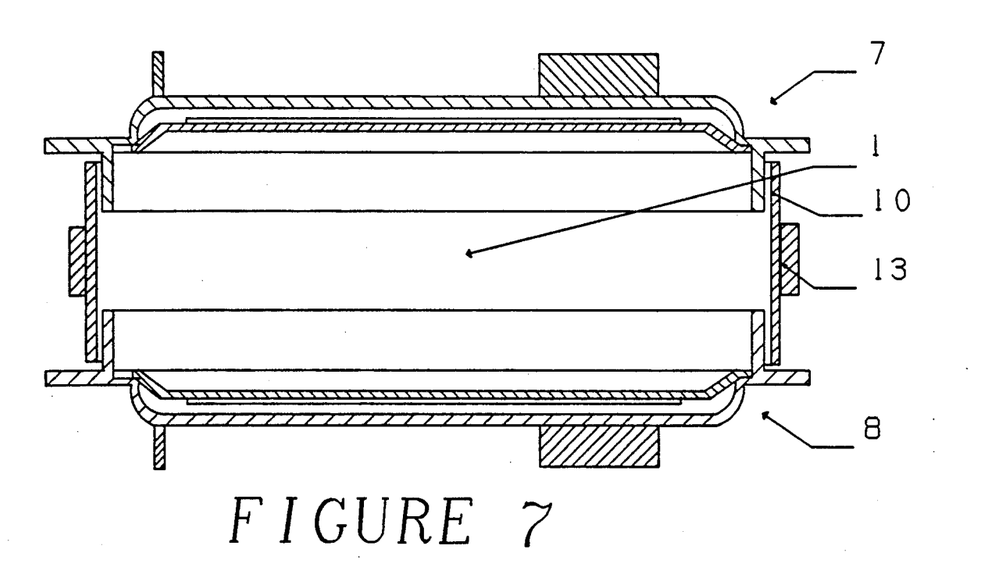
FIG. 7 illustrates a side-view cross-section of a first heating member employed as cover and as an upper heating element, a second heating member employed as a pan and as a bottom heating member, a medium-band enclosing a chamber formed by said first and second heating members.

FIG. 6 is similar to FIG. 5 except that an engaging, securing member 10 of FIG. 6 is taller than the securing member 9 of FIG. 5, whereby the heating members 7, 8 are spaced apart to create a larger volume cooking chamber 1a. FIG. 7 is similar to FIGS. 5 and 6, except that the securing member, 11 of FIG. 7 has a height which is intermediate between that of the members 9, 10 of FIGS. 5, 6 respectively, whereby the cooking chamber 1b has a volume which is less than the volume of the cooking chamber 1a of FIG. 6 but greater than the volume of the cooking chamber 1 of FIG. 5.

METHODS OF OPERATING THE INVERTIBLE, MICROWAVE-OVEN OVEN

In a top feed microwave oven (e.g. a microwave oven where the microwaves enter the oven from the top), the top, microwave-absorptive heating member 7 heats more rapidly than the bottom, microwave-absorptive heating member 8. This is one reason a cook may choose to invert the microwave-oven oven after preheating. The cook must consider if the microwave oven, which he employs to heat the invertible, microwave-oven oven, is a top, a side, a bottom or a combination feed oven. The cook must also decide how many times, if at all, during a cooking procedure, he chooses to invert the microwave-oven oven. The cook may shake the oven, to stir the food within, and may invert the oven before or while shaking the food.

As can be observed, by examining FIGS. 5, 6, and 7, the invertible, microwave-oven oven is provided with different height, engaging, securing members, a small-height, securing member 9 (FIG. 5), a medium-height, securing member 10 (Figure) and a large-height, securing member 11 (FIG. 6). Depending on the cooking results desired and on the size and type of food, the first metal grill 3A and the second metal grill 3B may be secured from one inch to eight inches apart. Additionally, medium-height, securing member 10 (FIG. 7) and large-height, securing member 11 (FIG. 6) may be provided with a small-width microwave-shielding member 13 or a medium-width, microwave-shielding member 12. Preferably, the microwave shielding members 11, 13 are bands of metal, e.g., steel or aluminum. It is expected that some designers will use well known measures to make the size of the securing members 9, 10, 11 and the microwave-shielding members 12, 13 thereon, adjustable.

Figure 15:
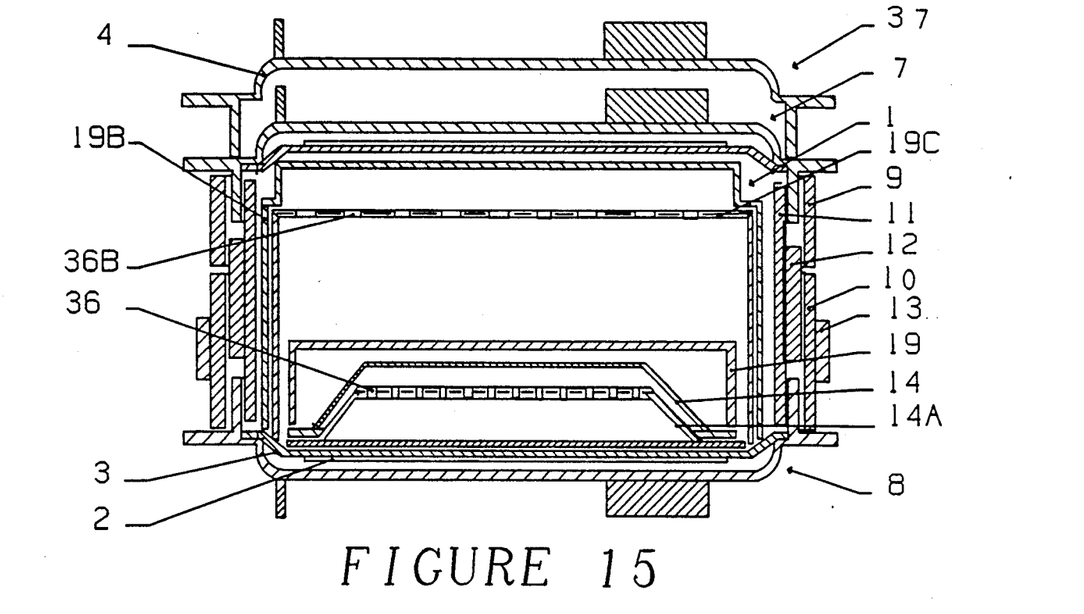
FIG. 15 illustrates the combination and nesting together of my invertible, microwave-oven oven and the invertible apparatus of my related inventions for shipping and storage.

As will be more fully set forth hereinafter, all of the members 7, 8, and 9 and accessory apparatus, illustrated in FIG. 15, are intended to be of such shape and configuration that they can be employed in various combinations. Be selecting an appropriate height securing member, with or without an appropriate width microwave shielded member, the cook selects how much of the microwave energy irradiating the cooking chambers 1, 1a, 1b that he wishes to enter the cooking food directly.

The microwave-absorptive heating members, as illustrated in FIG. 1 to 4, comprise a high-temperature resistant, microwave-transmissive vessel 4, a metal grill 3, a microwave absorptive substance 2 in contact with a surface of metal grill 3, an engaging structure 22, and an interior chamber 30 preferably filled with a microwave-non-absorptive heat insulator 31 which can be a particulate, thermal-insulating substance such as vermiculite. The heating members 7 and 8 have appropriate handle elements 5 which are fabricated from microwave-transparent heat-insulating materials. Preferably the metal grilling plate 3 is flat but in some embodiments, the grill may be dished, i.e. concave, to facilitate frying eggs, infra, or baking cakes, infra.

The metal grill 3 is preferably formed from aluminum alloys although steel, copper or other metals and metal alloys may be employed. The metal grill 3 must transmit heat energy quickly and provide a rugged, reusable, cleanable cooking surface.

The microwave-absorptive substance 2 preferably is a dispersion of ferrite particles in an appropriate carrier such as a silicone rubber or other temperature-resistant carriers. In a preferred embodiment, a silicone rubber coating composition is filled with ferrite particles and applied as a relatively thick coating (up to about 5 millimeters) to the reverse surface of the metal grill 3. The size of the metal grill 3 establishes the size of the other members of the invertible, microwave-oven oven. Typically the metal grill 3 has a diameter from 6 to 15 inches, preferably about 8 to 12 inches.

As seen in FIGS. 5, 6 and 7, an important feature of this invention is that heating members 7 and 8 have substantial mass, preferably from about 1.5 to 3 pounds, whereby a reliable sealing engagement is established, between engaging securing member 9, 10 or 11 and engaging structures 22, sufficient to permit development of superatmospheric pressure in chamber 1. The engaging securing member 9 may be transparent to light. The engaging securing member 22 can be formed from heat resistant glass or plastic to permit viewing of food cooking within chamber 1.

It will be observed, in FIG. 5, that the handle members 5A and 5B are relatively close together and aligned to permit the cook to lift, shake, invert and/or carry the assembly, of FIG. 5, as a unit.

Figure 10:
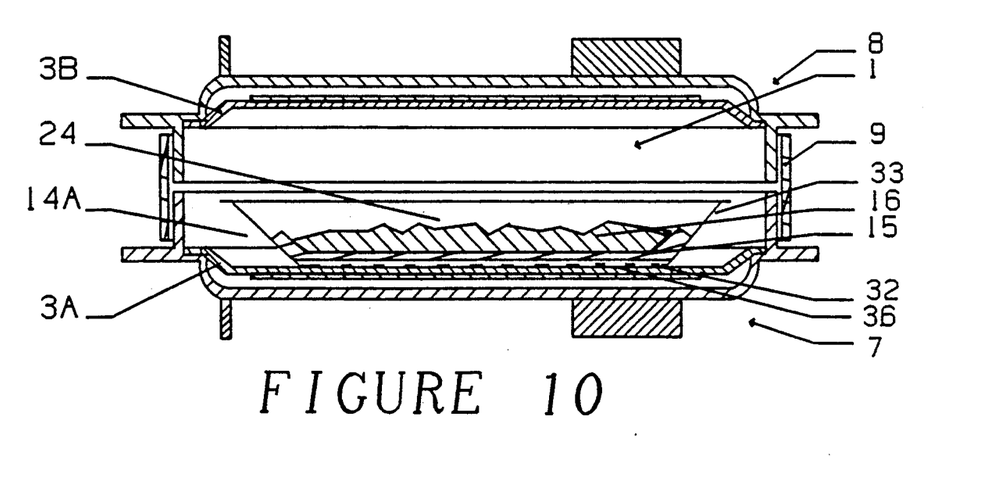
FIG. 10 illustrates a side-view cross-section of the microwave-oven oven of FIG. 9 inverted so that the second heating member is the top cover and the first heating member is the pan. A pizza pie is illustrated in the open-side up, pizza pie pan in the cooking chamber.

Optional pan 14, in FIG. 10, includes a base 32 and upstanding side walls 33, preferably outwardly flared. Optional pan 14, preferably, is fabricated from aluminum or aluminum alloy. Optional pan 14 functions to prevent spread of liquids and cooking juices from food products which are being heated in the microwave-oven oven. The base 32 of the pan 14 is fabricated to rest in direct heat exchange engagement with the exposed surface of the metal grill 3A as is clearly shown in FIG. 10. Some may prefer to employ as assortment of pans, a frying pan, a pizza pan, a pie pan and a cake pan. In FIG. 10, pan 14 is confined within steam confining chamber 1 and supports pizza pie 24 being baked therein.

The first heating member and the second heating member 8 can be employed individually or together as an invertible microwave-oven oven. They can be employed in a variety of food heating sequences depending upon the nature of the food and the desires of the cook. After cooking, the invertible, microwave-oven oven may be disassembled an utilized as two sizzling-hot, serving dishes.

The invertible, microwave-oven oven is a versatile cooking appliance in the hands of a practiced cook. There follows a list of foods that have been successfully prepared in an invertible, microwave-oven oven: apple turnovers; large and small bagels, rolls, baked potatoes; biscuits and cakes baked from raw dough; corn beef hash; eggs, in and out of the shell; different cuts and types of French fried potatoes; French toast; fried chicken; hot dogs and hot dog rolls; meats (e.g. steaks, lamb chops, etc.); pancakes; pigs in a blanket; pizza pie; large pretzels from raw dough; toasted cheese sandwiches; TV dinners and entrees; both large and small, two-crust meat and fruit pies; convenience waffles; quiche; and vegetables with wok cooking results. Representative cooking examples and procedures follow:

I. A PIZZA PIE

Figure 8:
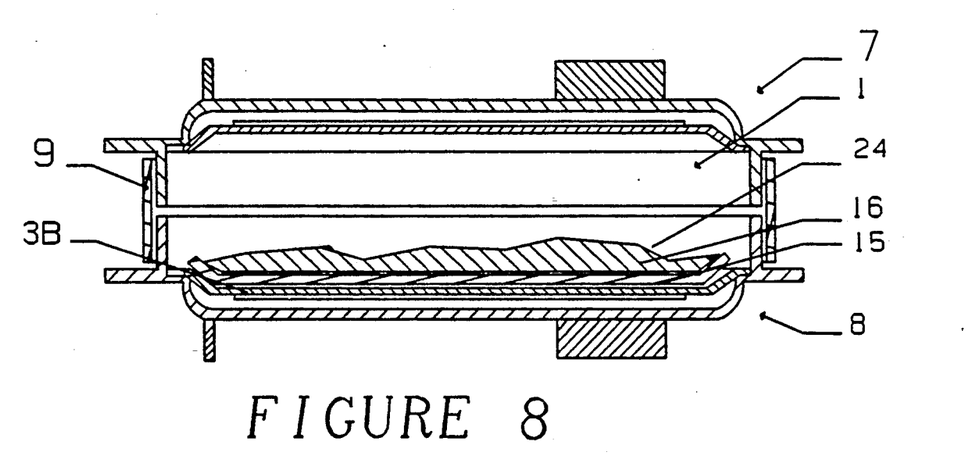
FIG. 8 illustrates a side-view cross-section of a microwave-oven oven, similar to FIG. 5. containing a pizza pie in the steam-confining, cooking chamber.

In FIG. 8 a first heating member 7 is employed as a cover and as an upper heating member, over second heating member 8 which is employed as a pan and as a bottom heating member. A pizza pie 24 is illustrated in the cooking chamber 1 formed by the two heating members 7 and 8 and engaging, securing member 9. In operation, the invertible, microwave-oven oven is preheated empty, in a microwave oven (not shown), until the second heating member 8 on top reaches a browning temperature. Whereupon, the invertible, microwave-oven oven is removed from the microwave oven, is inverted and opened. Pizza pie 24 is place on the hot, second metal grill 3B. The microwave-oven shown in FIG. 8 is returned to the microwave-oven oven, with pie 24 inside and, is exposed to microwave energy until pizza pie crust 15 has crusted and pizza pie topping 16 has melted.

II. PIZZA PIE BAKED IN A PIZZA PIE PAN

Figure 9:
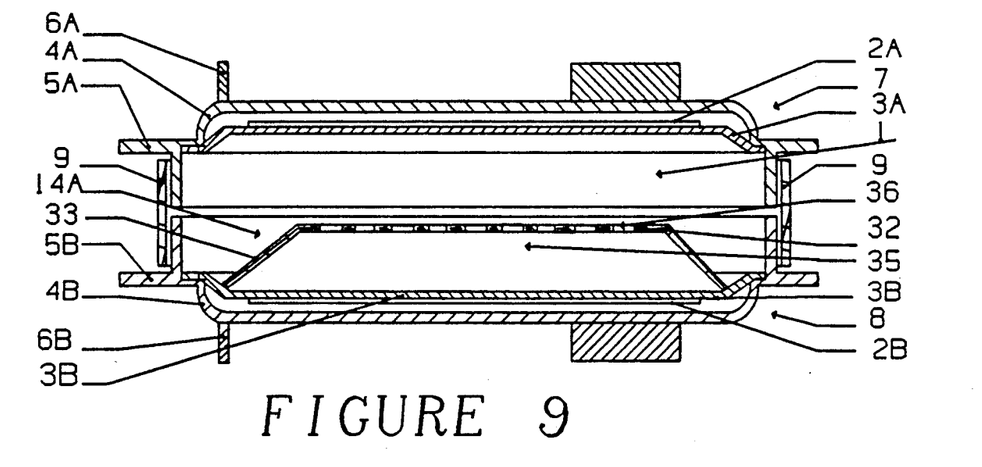
FIG. 9 illustrates a side-view cross-section of a microwave-oven oven, similar to FIG. 5, including an inverted, pizza pie pan in the cooking chamber.

The invertible, microwave-oven oven, in FIG. 9 and 10, may be employed to prepare a frozen pizza pie 24A wherein pizza pan 14 is first placed empty, upside down on grill 3B. The invertible, microwave-oven oven, of FIG. 9, is heated, with inverted pizza pan 14 and without pizza pie 24A, in a microwave oven, to as suitable elevated temperature, circa 350-500 degrees F. Whereupon, the invertible, microwave-oven oven is removed from the microwave-oven and inverted and empty pizza pan 14 inverts and falls by gravity, and lands in its right side up position, onto grill 3A. As illustrated in FIG. 10 frozen pizza pie 24A is placed on pizza pan 14. The bottom of the pizza pan 14 is in heat transfer relationship with grill 3A whereby bottom crust 15 of pizza pie 24A becomes rapidly heated and crusted by direct conduction of heat energy. The base 32 of pizza pan 14 may be supplied with perforations 36.

The invertible, microwave-oven oven, with pizza pie 24A in pizza pan 14, is exposed to microwave energy. Microwave energy reaching pizza pie 24A directly through microwave-permeable, engaging member 9, heats topping 16 of pizza pie 24A and causes moisture from pizza pie 24A to form steam within steam confining chamber 1. Steam, at a superatmospheric pressure, determined by the weight of second heating member 8 and the temperature of grill 3B, fills steam confining chamber 1.

If frozen pizza pie 24A is a frozen convenience food supplied with its own aluminum foil tray, optional pan element 14 is not required and the assembly may be used as illustrated FIG. 8. The supplied aluminum foil tray with the accompanying pizza pie 24A may applied directly to grill 3B. A perforated or non perforated aluminum foil pizza pan may be used.

III. A FROZEN TWO-CRUST PIE

A frozen two-crust pie presents difficulties in microwave cooking because of several different heating requirements. The bottom pie crust and the top pie crust require high temperatures for baking the pastry and browning it to an esthetically pleasing appearance—without burning. The interior of the frozen pie is largely water (e.g., apple pie, cherry pie, meat pie, etc.) which requires thawing and subsequent heating to complete its cooking cycle.

Figure 11:
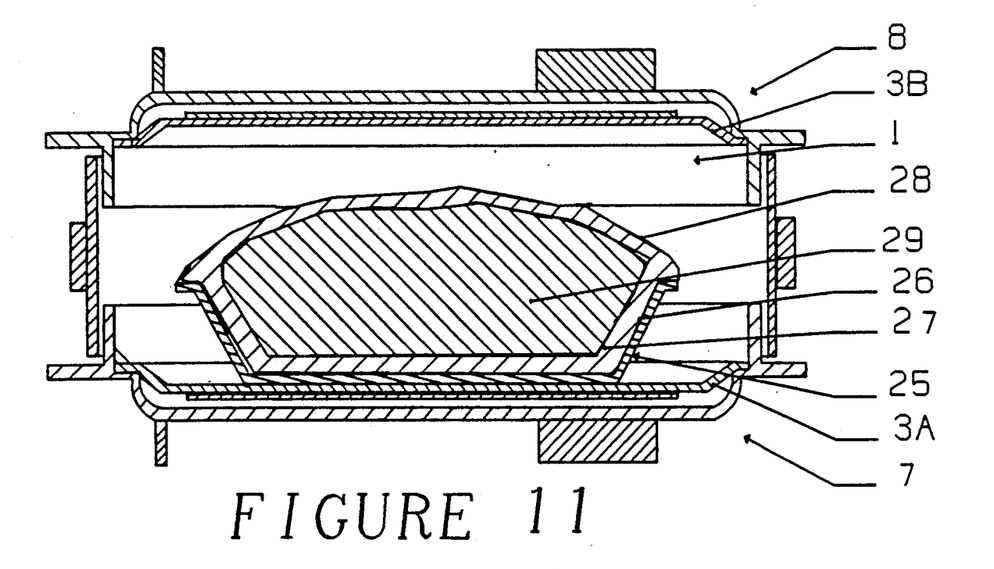
FIG. 11 illustrates a side-view cross-section of the invertible, microwave-oven oven containing a pie pan and a two crust pie.

A frozen two-crust pie 25 can be baked successfully by initially preheating the empty invertible, microwave-oven oven, assembled as shown in FIG. 5, until the top metal grill 3A is at a temperature sufficient to bake a pie crust. The preheated assembled microwave-oven oven is removed from the microwave oven by means of the juxtaposed handles 5A and 5B and inverted. A frozen 8 ounce, two-crust, meat pie 25 is introduced as illustrated in FIG. 11, into the chamber 1 in its metal pie plate 26 which is placed directly upon the metal grill 3A. Second heating member 8 is replaced and the assembly, as shown in FIG. 11, is returned to the microwave oven and exposed to microwave energy. The very high temperature of preheated metal grill 3B is transmitted directly through the metal pie plate 26 into the frozen pie 25 causing defrosting and baking of a bottom pie crust 27. Microwave energy passing through top pie crust 28 bakes pie crust 28 and defrosts and heats the top of pie filling 29 that it contact. The center of pie filling 29 is heated by conduction, e.g. heat conducted downwardly, from the top pie crust 28, and by heat rising upwardly, from the metal grill 3A, through metal pie plate 26 and bottom pie crust 27. If upper pie crust 28 in imperforate, it is easier for top pie crust 28 to rise upwardly and bake in a dome shape.

This invention differs from the pie baking taught in the related U.S. Pat. Nos. 4,906,806 and 4,923,704 supra in that two-crust pie 25 additionally heats from heat released by heating member 8. During baking the second heating member 7 is cooled by the baking, unbaked pie 25, but heating member 8 is free to rise in temperature (circa 500° F. in a typical full power domestic microwave oven) and acts as a radiant heating element. Steam, released from baking pie 25, which contacts hot grill 3B, becomes superheated and is confined around baking pie 25 within steam confining chamber 1.

In operation, the cook considers the weight of the heating members 7 and 8 and chooses the amount of time to preheat heating members 7 and 8 so that, when pie 25 contacts the preheated grill 3A, a suitable amount of stored heat will be available for delivery to the bottom pie crust 27. A small 8 oz. meat pie, with a liquid filling, may require more preheating and/or standing time on hot metal grill 3A.

For some pies, as a 26 oz. frozen fruit pie, preheating of the first and second heating members 7 and 8, to store heat, may not be necessary. While a large pie defrosts and its top pie crust browns, grill 3A has adequate time to heat and brown bottom pie crust 27.

The invertible, microwave-oven oven, of FIG. 11, also can be employed to bake freshly prepared two-crust pies, i.e., pies which have not been frozen. The apparatus, of FIG. 11, may be employed to cook one-crust pies by placing the frozen one-crust pie, in its metal pie plate, into the invertible, microwave-oven oven and placing the assembly into a microwave oven and exposing it to microwave energy. In all the recited cases, the pie is confined within steam-confining chamber 1 while in the baking process.

IV. ALTERNATIVE TECHNIQUE FOR BAKING PIES

Figure 12:
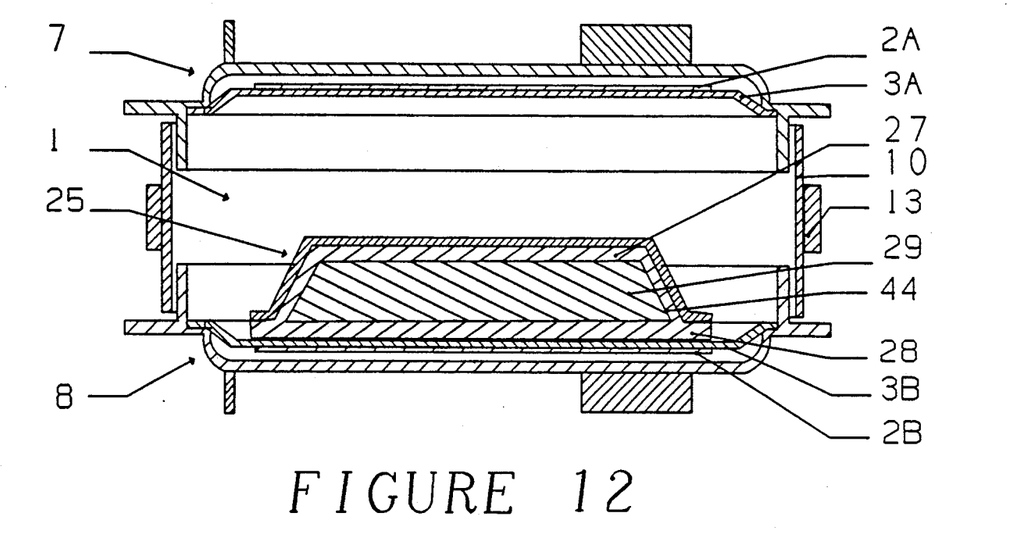
FIG. 12 corresponds to FIG. 11 with an inverted two-crust pie, in its metal pie pan, into cooking chamber.

An alternate technique for baking two-crust pies can be described in connection with FIGS. 11 and 12. A frozen meat pie 25, or other moist ingredient pie 25, having a bottom pie crust 27, which is difficult to bake satisfactorily in a conventional oven, can be baked in a novel manner in the invertible, microwave-oven oven. As shown in FIG. 12, frozen, unbaked pie 25 is provided, on an aluminum pie pan 26. Pie 25 includes a bottom pie crust 27, a top pie crust 28, a side crust 44 and a moisture containing filling 29. It will be observed that the top pie crust 28 extends to the margins flanges of the pie pan 26. The frozen pie 25 is placed upside down into chamber 1, with its top pie crust 28 against metal grill 3B, and chamber 1 is covered by heating member 7. The assembly, as shown in FIG. 12, is placed in a microwave oven and exposed to microwave energy. The microwave energy cannot penetrate the metal pie pan 26; accordingly the microwave energy functions to create heat in microwave-absorptive materials 2A and 2B. Heat generated in second absorptive material 2B is transmitted to second metal grill 3B and thence to the top pie crust 28 until top pie crust 28 thaws and partially bakes to a suitable brown coloring. Thereafter, the invertible, microwave-oven oven is removed from the microwave oven and inverted. The frozen pie 25 has its top pie crust 28 partially prebaked and its bottom pie crust 27 defrosted and heated from the steam evolved during the prebaking of top pie crust 28 and from heat released from preheating first heating member 7. The aqueous pie filling 29. remains frozen through the prebaking of the top pie crust 28. Thus pie 25, essentially frozen, can be easily inverted if the invertible, microwave-oven oven is inverted swiftly enough. As seen in FIG. 11, pie 25, now in its normal position, within the invertible, microwave-oven oven, is returned to the microwave oven and baking of pie 25 is completed. During the final stage of baking, bottom pie crust 27 is heated primarily by conduction of heat energy from metal grill 3A through pie pan 26. The aqueous filling 29 is heated primarily by microwave energy which penetrates top pie crust 28. Right side up, pre-browned top pie crust 28, now free to rise, will rise, crust and turn brown. Chamber 1 becomes filled with superatmospheric steam evolved from baking pie 25, which steam strikes first and second metal grills 3A and 3B, superheats and aids the heating and baking of pie 25.

Typically, in the operation described in connection with FIG. 12, the preferred defrosting and partial prebrowning of the top crust of the pie occurs approximately two minutes after the time normally required for the temperature of second metal grill 3B to rise to a temperature of 350 degrees F. For example, if second grill 3B requires seven minutes to rise to 350 degrees F., then in contact with frozen pie crust 28, metal grill 3B will heat in about nine minutes.

The cook can control the results (e.g. the temperature of the pie crust in relationship to the temperature of the pie filling) by selecting which engaging, spacer member 9, 10 or 11 to employ. If the cook utilizes small-height spacer 9, there results in a new microwave product—a pie crust fully baked and still hot surrounding a pie filling which is defrosted and still cold or slightly warm. In this new product, the pie filling has not had a chance to "overcook". For example, in an apple pie filling, the apple slices still retain their turgor and robustness and the results are not the same as the "apple sauce" filling associated with conventional baking. The standing time, normally taught, after baking a pie conventionally, is obviated. If the cook employs a large-spacer member 11, and follows the same procedure, except that a longer baking time is required, the results are directly comparable to conventional baking (e.g. an "apple sauce" filling and a conventional standing time requirement).

V. SOFT COOKING AND FRYING EGGS

It is known that fresh eggs are sensitive to microwave oven cooking and, if heated in a microwave oven, are frequently cooked unevenly with some parts firm and other parts essentially raw. The unevenness can be offset in part by providing rotating tables or by frequently opening the microwave oven and manually stirring or moving the egg to different locations within the microwave oven chamber. However, when eggs are cooked, according to the present invention a heated pan 14, in combination with the heat stored within the invertible, microwave-oven oven, retains appropriate heat to complete cooking of a raw egg to the desired degree of firmness outside the microwave oven.

The combination, of an optional pan 14 (not shown), with an egg (not shown) in the invertible, microwave-oven oven (FIG. 5) maya be employed to duplicate the utility of "a pan of boiling water" or as a "frying pan". The combination is placed into a microwave oven, with or without water as appropriate, the heated until a predetermined temperature is achieved. The unit is then removed from the oven and, in its heated condition, can be employed for soft cooking or frying eggs outside the microwave oven.

Figure 13:
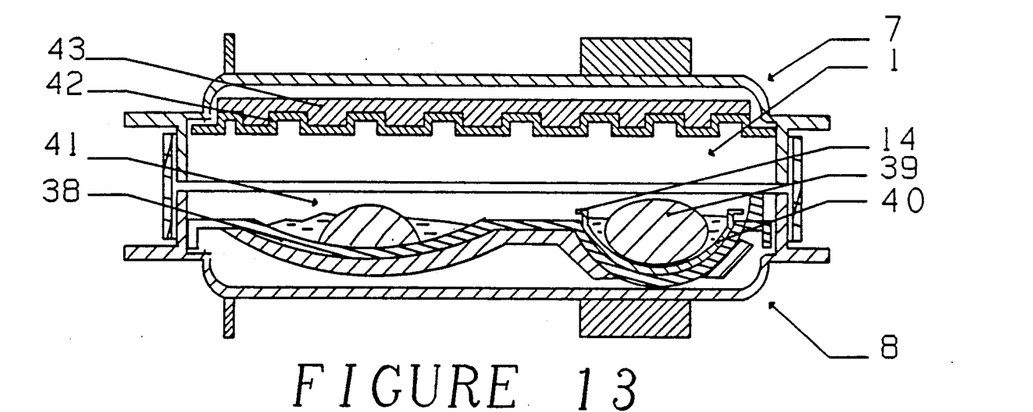
FIG. 13 illustrates a side-view cross-section of an invertible, microwave-oven oven similar to FIG. 5 containing a pan to cook eggs.

As seen in FIG. 13, metal grill 38 may be concave, when employed to fry an egg, to confine the egg to a selected area on grill 38. The top heating member may be removed, during the final stages of frying, to change the appearance of the eggs from one over lightly to sunny side up.

V A. SOFT COOKING AN EGG

The invertible, microwave-oven oven, has an aluminum foil pan 14 and a small quantity of water 40, as shown in FIG. 13. The preheated aluminum foil pan 14a can become a cooking pan to soft cook an egg therein. The invertible, microwave-oven oven is heated to a suitable temperature and, when sufficient heat is stored in the invertible, microwave-oven oven, an egg 28, in its shell, is placed in water 40. The heated, invertible, microwave-oven oven and the egg, therein, if the cook so chooses, is not exposed to microwave energy which cold "hard boil" the egg yolk before the egg white firms and the egg is cooked by the heat stored in the invertible, microwave-oven oven.

Note, in order to soft cook an egg, that (1) the time required to preheat the invertible, microwave-oven oven is a fraction of the time required to fry an egg; (2) the metal pan 14a is not preheated empty; (3) no effort, as adding oil to make good thermal contact between pan 14a and grill 3A, is made; and (4) the invertible, microwave-oven oven is not inverted after heating and before cooking the egg. An egg may slowly soft cooked to individual taste, i.e., about five minutes, solely from the heat energy stored in the invertible, microwave-oven oven.

When the invertible, microwave-oven oven, as shown in FIG. 13, is preheated empty for a predetermined time, the assembly is available to fry a shelled egg 41 placed on concave, metal grill 38. The length of time the invertible, microwave-oven oven is preheated and whether or not the invertible, microwave-oven oven or the egg 41 is inverted determines how egg 41 will fry.

Other foods which can be fried or frilled can be placed on the heated combination of the invertible, microwave-oven oven and pan therein. In an invertible, microwave-oven oven, advantageously, (1) useful heat can be stored for subsequent use in metal heating grills 3A and 3B; (2) splatter is contained; and (3) the food is shielded from the cooling action of the circulating air which is present in most microwave oven chambers.

VI. CAKE BAKING

Baking cakes in microwave ovens, in the past has been difficult because of the unevenness of microwave heating. Cakes tend to rise unevenly which results in an undesirable, irregular top surface.

Figure 14:
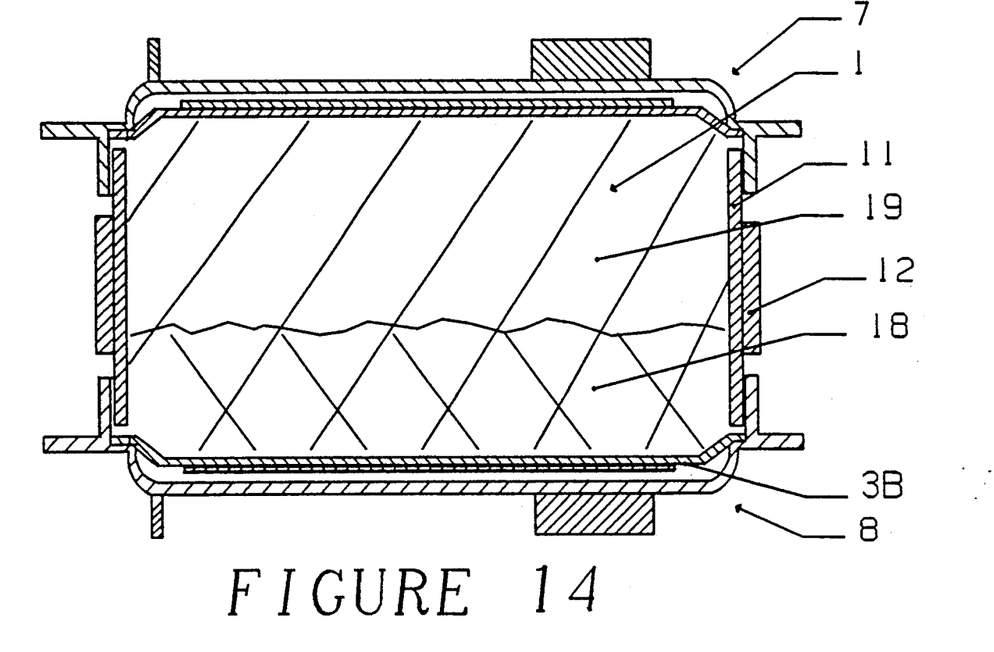
FIG. 14 illustrates a side-view cross section of an invertible, microwave-oven oven with a connecting member adapted for baking cakes.

As shown in FIG. 14, according to the present invention, a bread dough or cake batter 18 is mixed and placed directly onto grill 3B in cooking chamber 1 or into a lightly-greased bread or cake pan (not shown) in cooking chamber 1. Bread dough or cake batter 18 is baked as a result of (1) exposure to microwave energy, (2) by conductive, convective and radiant heat from the invertible, microwave-oven oven and (3) by superatmospheric steam in cooking chamber 1.

The invertible, microwave-oven oven is not preheated when baking a large bread or a cake. If the invertible, microwave-oven oven is preheated, the crust may burn before enough microwave energy has penetrated the dough or batter to fully bake the dough or batter.

The amount of time spent preheating, the amount and type of dough and whether or not the microwave-oven oven is inverted interact to establish if the top surface of the risen dough as batter will brown. To brown, the cook should start with enough raw dough or batter so that, on rising, the baked top surface will, physically contact the upper heating grill, brown and take on the configuration of the upper grill. Some cooks may initiate the baking of the raw dough or batter with tall engaging member 11 in place so that more microwave energy will directly irradiate the raw batter and, if desired, subsequently, replace the tall engaging member 11 with medium engaging member 10 to complete the baking of the raw dough or batter. Others may wish to bake the raw dough or batter in a high-temperature-glass cake pan rather than in metal cake pan so that more microwave energy enters a large mass of raw-dough The invertible, microwave-oven oven is versatile and provides the cook with many options. The invertible, microwave-oven oven accepts high-temperature plastic, paper board, glass and glass-ceramic pans as well as metal pans. As seen in FIG. 14, a cake batter 18 can be poured directly on second heating member 8 and the assembled invertible, microwave-oven oven with cake batter 18 therein, is exposed to microwave energy until the cake batter 18 bakes and rises to brown in contact with first heating member 7.

VII. DEFROSTING AND HEATING TV DINNERS

A frozen food (not shown) as conventionally packaged, on an aluminum foil tray or on a high-temperature-resistant plastic tray, or on other heat-resistant support, is placed in an invertible, microwave-oven oven, of the type shown in FIG. 5, and exposed, therein, to microwave energy. The frozen food is quickly and conveniently heated. The experienced cook will recognize and take into account that "after-cooking" of frozen food may occur.

The frozen food is heated by a combination of heat transferred from grill 3B into the frozen food and, at the same time, by microwave energy passing through microwave-transparent engaging member 9 into cooking chamber 1. The amount of dehydration of the frozen food is controlled because the steam volatilized from the heating food is confined, at slightly superatmospheric pressures within cooking chamber 1. It may be desirable to spray selected areas of the upper surface of frozen food with moisture, prior to defrosting and heating, in order to reduce the hydration tendencies of peas and carrots, for example, relative to meat portions. Adding water is more fully described in U.S. Pat. No. 4,390,555.

VIII. FROZEN FRIED FOODS

A novel process for heating and cooking frozen prefried foods (not shown), such as fried potatoes and fried chicken, utilizes the invertible, microwave-oven oven assembled as shown in FIG. 5. The invertible, microwave-oven oven is preheated to an operating temperature (about 500 degrees F.) by exposure to microwave energy in a microwave oven. Whereupon, the invertible, microwave-oven oven is removed from the microwave oven, inverted and a frozen fried food is placed into cooking chamber 1 on the first grill 3B of the first heating member 7. The preheated assembly is returned to the microwave oven and exposed to microwave energy until the food defrosts and heats to a temperature approaching a desired serving temperature. Thereupon, the invertible, microwave-oven oven is inverted so that the warm, fried food falls by gravity onto second metal grill 3B where the food bakes, browns, crusts fries and/or sears, as the case may be, in surface contact with the hot, second metal grill 3B. As desired, the food can be stirred conventionally or by removing the invertible, microwave-oven oven from the microwave oven and firmly holding handles 5A and 5B together and shaking the invertible, microwave-oven oven to agitate its food contents. The shaking process may be repeated, as desired, during the cooking process.

IX. HOT DOGS IN HOT DOG ROLLS

The invertible, microwave-oven oven is useful to prepare grilled hot dogs and toasted hot dog rolls. First the invertible, microwave-oven oven is preheated empty and inverted. Next the hot dogs are grilled, therein, and the invertible, microwave-oven oven, with the hot dogs, therein, is inverted. Hot dog rolls are added and toasted beside the hot dogs while the hot dogs finish grilling. Thereupon, the hot dogs are added to the hot dog rolls and, if desired, together, they are briefly grilled.

X. TOASTED BAGELS

The invertible, microwave-oven oven is useful to prepare toasted bagels. First the invertible, microwave-oven oven is preheated empty and inverted. Next frozen, pre-baked bagels are placed in the invertible, microwave-oven oven. The assembly is exposed to microwave energy until the bagels defrost and their crusts, additionally, bake. The invertible, microwave-oven oven, with the bagels therein, is inverted and again exposed to microwave energy. The bagels are removed. If desired, the bagels may be sliced and placed back in the invertible, microwave-oven oven with the inside dough of the bagels in contact with the hot grill. Whereupon, the invertible, microwave-oven oven is again exposed to microwave energy until the inside surfaces of the bagels are toasted. The result is a new product microwave-toasted-bagels which some persons may find more desirable than if the same bagel were toasted in a conventional toaster.

FIG. 15 illustrates one possible combination and nesting together of the invertible, microwave-oven oven and the invertible apparatus of the related inventions. A bread or cake pan is shown as shallow pan 19, deep pan 19B, and perforated-bottom pan 19C. A pie pan is shown as deep, metal pie pan 14 and as shallow, perforated-metal pie pan 14A. Pan 19B and pan 19C, pan 14 and pan 14A, and/or pan 14A and pan 19 may be employed to establish a microwave shielded chamber as described in my U.S. Pat. Nos. 4,906,806 and 4,923,704. The base 4, of heating member 7 may be employed as a steam confining cover in practicing U.S. Pat. Nos. 4,906,806 and 4,923,704. Metal grill 3 and heating element 2 may be fabricated to detach from microwave-permeable base 4 which will enable microwave-permeable base 4 to serve as a base and/or as a cover for the microwave shielded chamber.

GENERAL COMMENTS

1. Conventional, deep-fat frying can be more effectively simulated by applying a small quantity of cooking oil to the frozen prefried food to replace some of the oil which may be driven off during the microwave defrosting and heating.

2. Inversion of the invertible, microwave-oven oven must be swift enough so that centrifugal forces keep the contents of a plate from spilling out of the plate during inversion.

3. The cook may decide, while inverting the invertible, microwave-oven oven, to hold the invertible, microwave-oven oven vertical for a period of time sufficient to drain any unwanted liquid from a cooking food.

4. It is preferable that the shape, of the elements of the present apparatus, is circular. See FIGS. 3, 4. However, other shapes are feasible and in some cases even desirable, for example, generally square, preferably with rounded corners; rectangular, preferably with rounded corners; oval; and other shapes corresponding to the shape of the anticipated food article or container.

5. The invertible, microwave-oven oven may be of a one-piece construction with an access door.

6. The invertible, microwave-oven oven has been described as a general-purpose, heating apparatus. Notwithstanding, the invertible, microwave-oven oven can be fabricated as a special heat apparatus, for example:

a) an egg frying pan with a concave egg frying grill, b) a pie baking apparatus where the pie receiving surface, of the first heating member, is fabricated to duplicate the shape of a top pie crust and where the food receiving surface of the second heating member is fabricated to duplicate the shape of a conventional pie plate, c) a cake baking apparatus (1) whose baking chamber is the shape of the baked cake and whose walls are so perforated as not to trap air pockets which air pockets, if formed, would prevent the rising batter from completely filling the baking chamber and (2) whose walls are greases and floured before each use, d) a cup cake making apparatus where the invertible, microwave-oven oven's first and second grills are configured as cup cakes.

e) a waffle making apparatus, as seen in FIG. 13, where the invertible, microwave-oven oven's grill 42 is configured as a grill in a waffle iron and is heated by waffle-grill heating element 43.

7. When the cooking process is over, the closed, invertible, microwave-oven oven may be employed as a heat-insulated serving utensil to keep food warm for an extended time. When it is time to serve the still hot, cooked food, the invertible, microwave-oven oven is opened and disassembled into its components, a first heating member 7 and a second heating member 8. Thereupon, the first heating member 7 and the second heating member 8 may be employed as individual sizzling hot, serving dishes.

Although this invention has been described with a certain degree of particularity, it is understood that the present disclosure has been made only by way of example and that numerous changes in details of construction and arrangement of parts may be resorted to without departing from the spirit and scope of the invention.

I claim:

1. For use in a microwave oven, an invertible microwave cooking apparatus comprising:

first heat-generating member which includes a first heat-conductive metal grill surface having in contact with its reverse surface a first microwave-absorptive material;

a second heat-generating member which includes a second heat-conductive metal grill surface having in contact with its reverse surface a second microwave-absorptive material;

a retaining means to retain said first and second heat-generating members in engagement while the obverse of said first and second grill surfaces oppose each other in spaced-apart relation and while the said apparatus is inverted;

an enclosed cooking chamber defined by, at least, said first heat-generating member and said second heat-generating member and said retaining means;

said first heat-generating member which in its grill surface up position, supports food in contact with said first grill surface when said food is being heated; said first grill surface being below but not in contact with said second grill surface; and said first heat-generating member being further adapted, in its grill surface down position, to heat and confine vaporous cooking by-products released from food cooking in contact with said second heat-conductive metal grill.

2. The cooking apparatus, of claim 1, wherein the said cooking chamber is one to eight inches high.

3. The cooking apparatus, of claim 1, wherein the said first heat-generating member weighs between 1.5 and 3.0 pounds.

4. The cooking apparatus, of claim 1, wherein the said second heat-generating member weighs between 1.5 and 3.0 pounds.

5. The cooking apparatus, of claim 1, with said first heat-generating member in its grill surface up position, and including an auxiliary pan member having a base resting on the said first metal grill surface in heat transfer relationship, said pan being entirely confined within the said cooking chamber.

6. The cooking apparatus, of claim 5, wherein the said base of said auxiliary pan member is provided with perforations.

7. The cooking apparatus, of claim 1, wherein said first heat-generating member has at least one handle member and said second heat-generating member has at least one handle member, said handle members being arranged in juxtaposition to permit transport and inversion of said cooking apparatus as a unit.

8. The microwave cooking apparatus, of claim 1, wherein said first heat-generating member has a saucer-shaped grill surface.

9. The microwave cooking apparatus of claim 1 wherein said first heat-generating member is in its grill surface up position, and including an auxiliary imperforate metal pan member having a base and a rim, said rim being engaged with the said first metal grill surface within said cooking chamber, whereby said auxiliary pan and the cooking surface of said first metal grill define a microwave-shielded heating chamber.

10. The cooking apparatus, of claim 1, wherein said first and second heating members are individual, heated serving dishes.

11. The cooking apparatus of claim 1 wherein the means to retain said first and second heat-generating members in spaced-apart relation is a sleeve from 1 to 8 inches high.

12. The cooking apparatus of claim 11 wherein the said sleeve is microwave-transmissive.

13. The cooking apparatus of claim 12 wherein the said sleeve is partially covered with microwave-shielding.

14. The cooking apparatus of claim 11 wherein said sleeve is a cylinder.

15. For use in a microwave oven, an invertible microwave cooking apparatus comprising:

a first microwave-absorptive heating member, which has a first surface to heat a food in contact therewith, a second microwave-absorptive heating member having a second surface to heat a food in contact therewith, connector means which engages with said first and second microwave-absorptive heating members and keeps said first and second members in engagement while said apparatus is inverted, an enclosed cooking chamber defined by, at least microwave-absorptive heating member and said microwave-absorptive heating member and said connector means, said second microwave-absorptive heating member being adapted, in its second surface up position, to support food in contact with said second surface while said food is being heated; said second surface being below but not in contact with said first heating surface; said second microwave-absorptive heating member and said first microwave-absorptive heating member and said connector means defining a cooking chamber to confine vaporous cooking by-products released from food cooking.

16. The cooking apparatus, of claim 15, wherein the said second microwave-absorptive heating member weighs between 1.5 and 3.0 pounds.

17. The cooking apparatus, of claim 15, wherein the said first microwave-absorptive heating member weighs between 1.5 and 3.0 pounds.

18. The cooking apparatus, of claim 15, wherein the said first microwave-absorptive member and said second microwave-absorptive heating member each weighs between 1.5 and 3.0 pounds.

19. The cooking apparatus, of claim 15, wherein the said cooking chamber is one to eight inches high.

20. The cooking apparatus, of claim 15, with said second microwave-absorptive heating member in its second surface down position, including an auxiliary metal pan member having a base resting on the said first surface in heat transfer relationship and being entirely confined within the said cooking chamber.

21. The cooking apparatus, of claim 15, wherein said second microwave-absorptive heating member has at least one handle member and said first microwave-absorptive heating member has at least one handle member, said handle members being arranged in juxtaposition to permit transport and inversion of said cooking apparatus as a unit.

22. The cooking apparatus, of claim 15, wherein said first microwave-absorptive heating member is in its first surface up position, including an auxiliary imperforate metal pan member having a base and a rim, said rim being engaged with the said first surface within said cooking chamber, whereby said auxiliary pan and said first surface define a microwave-shielded heating chamber.

23. The microwave cooking apparatus, of claim 15, wherein said first heat-generating member has a saucer shaped first surface.

24. The cooking apparatus, of claim 15, wherein, said first and second heating members are individual, heated serving dishes.

25. For use in a microwave oven, an invertible cooking apparatus comprising:

a first heat-generating member, a spaced-apart second-heat generating member and an imperforate connecting wall member defining an enclosed cooking chamber;

said heat-generating members having a microwave-transmissive housing and a grill having an exposed cooking surface and microwave-absorptive means to heat said grill;

engagement means on each said housing peripherally disposed from said grill;

said connecting wall member being a sleeve having a side wall and two open ends, said sleeve being engaged at each open end with a said engagement means.

26. The cooking apparatus of claim 25 wherein said engagement means are supporting wall members extending from said housing; said supporting wall members are in surface engagement with a wall surface of said connecting wall member open ends.

27. The cooking apparatus of claim 26 wherein said connecting wall member is a cylindrical sleeve and said supporting wall members have a corresponding circular configuration.

28. The cooking apparatus of claim 27 wherein said connecting wall member has an outer diameter corresponding to the inner diameter of said supporting wall members whereby said supporting wall members are press-fitted over the outer surface of said connecting wall member.

29. The cooking apparatus of claim 27 wherein said connecting wall member has an inner diameter corresponding to the outer diameter of said supporting wall members whereby said supporting wall members are press-fitted against the inner surface of said connecting wall member.

30. The cooking apparatus of claim 25 wherein said grill is metal and said microwave-absorptive means is a microwave-absorptive member engaged in heat transmitting relation with said grill.

31. The cooking apparatus of claim 25 wherein said connecting wall member has a microwave reflective band covering at least a portion of its wall.

32. The cooking apparatus of claim 25 wherein said connecting wall member has a microwave-reflecting surface over at least a portion of its outer wall.

33. The cooking apparatus of claim 25 wherein each said heat generating member has at least one microwave-transmissive handle and said handles are juxtaposed.

34. The cooking apparatus of claim 25 wherein said cooking chamber is a steam-confining chamber.

35. The cooking apparatus of claim 25 wherein said connecting wall member has a length of 1 to 8 inches.

36. The cooking apparatus of claim 25 wherein said grill is circular.

* * * * *